(12) United States Patent
Takata

(10) Patent No.: US 10,223,056 B2
(45) Date of Patent: Mar. 5, 2019

(54) PRINTING MACHINE

(71) Applicant: RISO KAGAKU CORPORATION, Tokyo (JP)

(72) Inventor: Atsushi Takata, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/838,922

(22) Filed: Dec. 12, 2017

(65) Prior Publication Data

US 2018/0173480 A1 Jun. 21, 2018

(30) Foreign Application Priority Data

Dec. 20, 2016 (JP) ................................ 2016-246615

(51) Int. Cl.
G06F 3/12 (2006.01)
B41J 2/175 (2006.01)

(52) U.S. Cl.
CPC ........ G06F 3/1296 (2013.01); B41J 2/17546 (2013.01); G06F 3/124 (2013.01); G06F 3/1208 (2013.01); G06F 3/1215 (2013.01); G06F 3/1229 (2013.01); G06F 3/1258 (2013.01); G06F 3/1261 (2013.01); G06F 3/1285 (2013.01); G06F 3/1286 (2013.01); G06F 3/1291 (2013.01); G06F 3/1293 (2013.01)

(58) Field of Classification Search
CPC .... G06F 3/1296; G06F 3/1258; G06F 3/1261; G06F 3/1286; G06F 3/1291; G06F 3/1293; B41J 2/17566; B41J 2002/17569
See application file for complete search history.

(56) References Cited

U.S. PATENT DOCUMENTS

| | | | |
|---|---|---|---|
| 2002/0026379 A1* | 2/2002 | Chiarabini | G06Q 10/20 705/305 |
| 2005/0068562 A1* | 3/2005 | Ferlitsch | G06F 3/1208 358/1.14 |
| 2013/0148160 A1* | 6/2013 | Morimoto | G06F 3/1296 358/1.15 |
| 2014/0185084 A1* | 7/2014 | Cudak | G06F 3/1296 358/1.15 |

FOREIGN PATENT DOCUMENTS

JP 2015-210686 11/2015

* cited by examiner

*Primary Examiner* — Moustapha Diaby
(74) *Attorney, Agent, or Firm* — Greenblum & Bernstein, P.L.C.

(57) ABSTRACT

A printing control machine includes an obtaining section, a determination section, and a printing control section. The obtaining section obtains from each of a plurality of printing machines, ink information regarding an ink mounted to the each printing machine. The determination section determines whether or not each of the plurality of printing machines is within a similarity condition range on the basis of the ink information obtained by the obtaining section. The printing control section allocates a printing job to printing machines determined to be within the similarity condition range to make the determined printing machines perform printing.

5 Claims, 5 Drawing Sheets

FIG. 5

|  | FIRST PRINTING MACHINE | SECOND PRINTING MACHINE | THIRD PRINTING MACHINE | FOURTH PRINTING MACHINE |
|---|---|---|---|---|
| MAINTENANCE PERIOD [PAGES] Mn | 1000 | 400 | 1000 | 1000 |
| PRODUCTIVITY [ppm] Vn | 150 | 150 | 120 | 150 |
| MAINTENANCE TIME[s] MTn | 60 | 60 | 60 | 60 |

FIG. 6

|  | FIRST PRINTING MACHINE | SECOND PRINTING MACHINE | THIRD PRINTING MACHINE | FOURTH PRINTING MACHINE |
|---|---|---|---|---|
| PRODUCTIVITY [PAGES] Job WHEN EQUALLY DIVIDED | 25,000 | 25,000 | 25,000 | 25,000 |
| NUMBER OF TIMES OF MAINTENANCE [TIMES] | 25 | 62 | 25 | 25 |
| DIVIDED JOB PROCESSING TIME [s] JTn | 11,500 | 13,720 | 14,000 | 11,500 |
| NUMBER OF PAGES IN PRODUCTIVITY PER SECOND PSn | 2.174 | 1.822 | 1.786 | 2.174 |

FIG. 7

|  | FIRST PRINTING MACHINE | SECOND PRINTING MACHINE | THIRD PRINTING MACHINE | FOURTH PRINTING MACHINE |
|---|---|---|---|---|
| NUMBER OF PAGES IN PRODUCTIVITY AFTER DISTRIBUTION JPRn | 27,325 | 22,904 | 22,446 | 27,325 |
| DIVIDED PROCESSING TIME AFTER DISTRIBUTION [s] | 12,550 | 12,582 | 12,543 | 12,550 | ns
PRINTING MACHINE

CROSS REFERENCE TO RELATED APPLICATION

This application claims benefit of priority under 35 U.S.C. § 119 to Japanese Patent Application No. 2016-246615, filed on Dec. 20, 2016, the entire contents of which are incorporated by reference herein.

BACKGROUND OF THE INVENTION

1. Field of the Invention

The present invention relates to a printing control machine that makes printing machines, which are connected to the printing control machine through a network and configure a cluster, perform printing without lowering quality in printing.

2. Description of the Related Art

In recent years, many offices employ a printing system in which a computer and a plurality of printing machines are connected to each other through a network to configure a cluster, and the printing machines perform printing in distributed processing for one printing job sent from the computer.

Patent Literature 1 (Japanese Patent Application Laid-Open No. 2015-210686) discloses a technique regarding an image forming system that includes a plurality of image forming machines and a client machine. In the image forming system, the client machine stores plural pieces of identification information of the image forming machines each of which is a destination of printing data, sends the printing data to the image forming machines, and sends the stored plural pieces of identification information to the image forming machines to which the printing data has been sent. Each of the image forming machines receives the plural pieces of identification information from the client machine, which is the sender of the received printing data, and groups image forming machines identified by the received plural pieces of identification information.

The image forming system in Patent Literature 1 groups the image forming machines on the basis of the plural pieces of identification information of the image forming machines. This grouping thus does not consider properties of the image forming machines, and may have a problem in productivity and quality in printing.

For example, even though the image forming machines are the same model, there is a case where properties of inks used in one or more image forming machines among the image forming machines are different from those of inks used in the other image forming machines. In this case, if the image forming machines are simply grouped on the basis of the plural pieces of identification information of the image forming machines, properties of inks (color space information) used in the one or more image forming machines among the grouped image forming machines are different from those of inks (color space information) used in the other image forming machines. This causes coloring of prints printed by the one or more image forming machines to be different from that of prints printed by the other image forming machines. When all the prints are brought together, a user has an uncomfortable feeling about the finish.

SUMMARY OF THE INVENTION

The present invention is made in view of the above-described problem. An object of the present invention is to provide a printing control machine that makes printing machines, which are connected to the printing control machine through a network and configure a cluster, perform printing without lowering quality in the printing.

To achieve the above-described object, according to a first aspect of the present invention, there is provided a printing control machine that is connected to a plurality of printing machines through a network and, by clustering two or more printing machines among the plurality of printing machines, makes the two or more printing machines perform distributed processing for a printing job, the printing control machine including a processor that obtains from each of the plurality of printing machines, expendable supply information regarding an expendable supply mounted to the each printing machine, determines whether or not each of the plurality of printing machines is within a similarity condition range based on the expendable supply information, and allocates the printing job to printing machines determined to be within the similarity condition range to make the determined printing machines perform printing.

According to a second aspect of the present invention, the processor obtains maintenance information from each of the plurality of printing machines, determines whether or not each of the plurality of printing machines is within the similarity condition range based on the expendable supply information and the maintenance information, and allocates the printing job to the printing machines determined to be within the similarity condition range to make the determined printing machines perform printing.

According to a third aspect of the present invention, the printing machine further includes a display, wherein when there is a printing machine determined to be out of the similarity condition range, the processor displays an inquiry screen on the display to inquire whether or not to use the printing machine determined to be out of the similarity condition range, and wherein when it is instructed not to use the printing machine determined to be out of the similarity condition range, the processor allocates the printing job to the printing machines determined to be within the similarity condition range to make the determined printing machines perform printing.

According to a fourth aspect of the present invention, when it is instructed to use the printing machine determined to be out of the similarity condition range, the processor allocates the printing job such that the printing machines determined to be within the similarity condition range and the printing machine instructed to be used, complete printing processing of the printing job substantially at the same time.

According to a fifth aspect of the present invention, there is provided a printing system, including a plurality of printing machines, and a printing control machine that is connected to the plurality of printing machines through a network and, by clustering two or more printing machines among the plurality of printing machines, makes the two or more printing machines perform distributed processing for a printing job, wherein each of the plurality of printing machines sends, on reception of an inquiry of expendable supply information regarding an expendable supply mounted to the each printing machine and maintenance information set on the each printing machine, the expendable supply information and the maintenance information to the printing control machine, and wherein the printing control machine includes a processor that obtains the expendable supply information and the maintenance information from each of the plurality of printing machines, determines whether or not each of the plurality of printing machines is within a similarity condition range based on the expendable supply information and the maintenance information, and allocates the printing job to printing machines determined to be within the similarity condition range to make the determined printing machines perform printing.

According to the first aspect of the printing machine in the present invention, the processor obtains the expendable supply information regarding an mounted expendable supply from each of the plurality of printing machines, determines whether or not each of the plurality of printing machines is within the similarity condition range based on the expendable supply information, and allocates the printing job to printing machines determined to be within the similarity condition range to make the determined printing machines perform printing. This prevents a user from having an uncomfortable feeling about the finish when all the prints are brought together.

According to the second aspect of the printing machine in the present invention, the processor obtains the expendable supply information regarding the expendable supply and the maintenance information from each of the plurality of printing machines, determines whether or not each of the plurality of printing machines is within the similarity condition range based on the expendable supply information and the maintenance information, and allocates the printing job to printing machines determined to be within the similarity condition range to make the determined printing machines perform printing.

For example, even though a plurality of printing machines are the same model, there is a case where a printing machine, which uses an expendable supply whose properties are different from those of expendable supplies used by the other printing machines, is connected to the printing control machine through the network. When the properties of expendable supply used by the printing machine are close to those of expendable supplies used by the other printing machines, the printing machine is determined to be within the similarity condition range, and coloring of prints printed by the plurality of printing machines are substantially the same. When all the prints are brought together, a user thus does not have an uncomfortable feeling about the finish. In addition, there is a case where the printing machine has maintenance information (frequency of maintenance, intensity of maintenance, and the like) different from maintenance information (frequency of maintenance, intensity of maintenance, and the like) of the other printing machines. When the frequency of maintenance and the intensity of maintenance are close to those of the other printing machines, the printing machine is determined to be within the similarity condition range. Accordingly, it is possible to make time until each printing machine finishes the allocated printing job almost equal in the plurality of printing machines.

When a cluster is configured with two or more printing machines connected to the printing control machine through the network, it is therefore possible to perform printing without lowering productivity and quality in the printing.

According to the third aspect of the printing machine in the present invention, when there is a printing machine determined to be out of the similarity condition range, the processor displays a screen on the display to inquire whether or not to use the printing machine determined to be out of the similarity condition range. When it is instructed not to use the printing machine determined to be out of the similarity condition range, the processor allocates the printing job to printing machines determined to be within the similarity condition range.

This enables the printing control machine to determine whether or not to perform printing by clustering by taking user's intention into consideration.

According to the fourth aspect of the printing machine in the present invention, when it is instructed to use a printing machine determined to be out of the similarity condition range, the printing job is allocated such that the printing machines determined to be within the similarity condition range and the printing machine instructed to be used complete printing processing of the printing job substantially at the same time.

For this reason, when a printing machine being out of the similarity condition range is included in the clustering objects, it is possible to perform printing processing without lowering productivity to the utmost.

According to the fifth aspect of the printing machine in the present invention, when a cluster is configured with two or more printing machines connected to the printing control machine through the network, printing is performed without lowering productivity and quality in the printing.

BRIEF DESCRIPTION OF THE DRAWINGS

FIG. 5 is a table showing an example of a maintenance period, productivity, and time for maintenance of each of the printing machines, which is an object of clustering on the printing control machine according to the exemplary embodiment of the present invention.

FIG. 6 is a table showing an example of a calculation result of distributed processing for each of the printing machines, which is the object of clustering on the printing control machine according to the exemplary embodiment of the present invention.

FIG. 7 is a table showing an example of a calculation result of distributed processing for each of the printing machines, which is the object of clustering on the printing control machine according to the exemplary embodiment of the present invention.

DESCRIPTION OF THE EMBODIMENTS

A printing control machine according to an exemplary embodiment of the present invention will be described below with reference to the accompanying drawings. The printing control machine according to the exemplary embodiment presents an example of an apparatus and the like for realizing the technical concept of the present invention. The technical concept of the present invention regarding the arrangement and the like of various structural components is not limited to the embodiment. Various modifications can be made in the technical concept of the present invention within the scope of claims.

Figure 1:
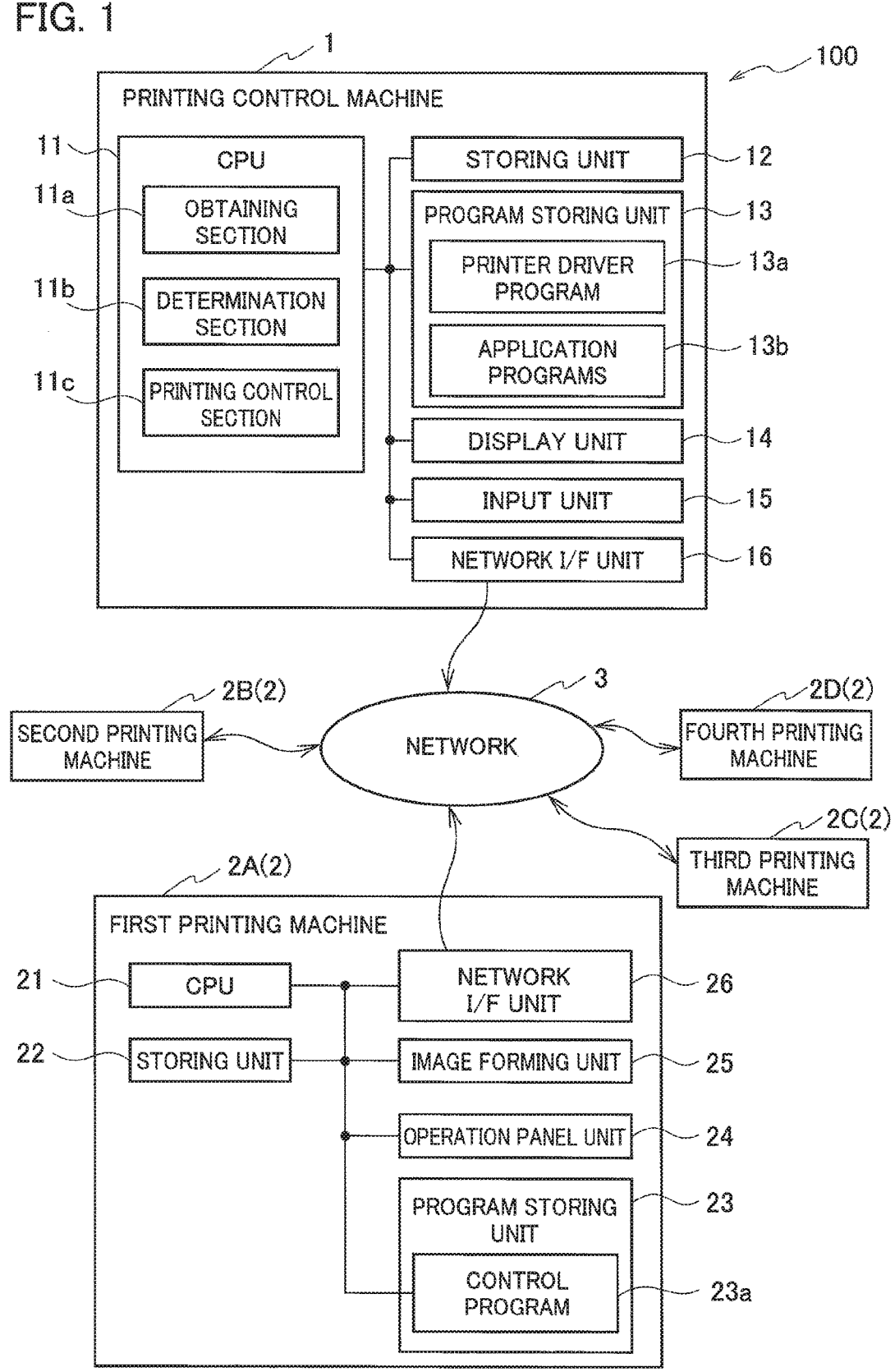
FIG. 1 is a diagram illustrating a configuration of a printing system according to an exemplary embodiment of the present invention.

FIG. 1 is a diagram illustrating a configuration of a printing system 100 according to an exemplary embodiment of the present invention. The printing system 100 includes a printing control machine 1 and a plurality of printing machines 2.

As shown in FIG. 1, the printing control machine 1 is connected to a first printing machine 2A, a second printing machine 2B, a third printing machine 2C, and a fourth printing machine 2D through a network 3 such as a wired or a wireless intranet or Internet. The printing control machine 1 sends a printing job to the first printing machine 2A, the second printing machine 2B, the third printing machine 2C, and/or the fourth printing machine 2D, and makes each printing machine form an image. It is noted that the first printing machine 2A, the second printing machine 2B, the third printing machine 2C, and the fourth printing machine 2D have the same hardware configuration. When there is no need to draw a distinction among the first to fourth printing machines 2A to 2D, each printing machine will be described as the printing machine 2 in the following explanation.

The printing machine 2 includes a CPU (processor) 21, a storing unit 22, a program storing unit 23, an operation panel unit 24, an image forming unit 25, a network I/F unit 26 to be connected to the network 3, and the like.

The storing unit 22 stores a printing job sent from the printing control machine 1, and a clustering object flag which indicates whether or not the printing machine 2 is an object of clustering.

The program storing unit 23 stores a control program 23a for the CPU 21 to control operations of the whole of the printing machine 2.

The operation panel unit 24 receives various settings for the printing machine 2 through user operations such as power-on and power-off, switching in image forming including a copy, a printing and the like, and a combination of the number of sheets, the size of the sheets, and density of printing in the image forming. Moreover, when the printing machine 2 is removed from the object of clustering, the operation panel unit 24 displays a message regarding this matter thereon, as will be described below.

The image forming unit 25 forms an image on the basis of a printing job received from the printing control machine 1. The image forming unit 25 performs image forming in various printing methods including an inkjet method to discharge ink drops from ink heads for respective colors, a stencil printing method, a laser printing method, and the like.

The CPU 21 executes the control program. 23a stored in the program storing unit 23 to control the whole of the printing machine 2. When requested to send setting information from the printing control machine 1, the CPU 21 sends setting information of the printing machine 2 to the printing control machine 1 through the network 3. The setting information includes ink information (expendable supply information) regarding ink properties such as color space information of an ink, and maintenance information regarding maintenance such as a maintenance period and maintenance intensity. The maintenance period is set to one of three levels of "long", "medium", and "short". The maintenance intensity is set to one of three levels of "strong", "medium", and "weak".

The printing control machine 1, which is a computer machine such as a general-purpose personal computer, a tablet, or a smartphone, generates a printing job and sends it to the printing machine 2 through the network 3, and makes the printing machine 2 perform printing. The printing control machine 1 includes a CPU (processor) 11, a storing unit 12, a program storing unit 13, a display unit 14 such as a liquid display, an input unit 15 such as a keyboard or a mouse, a network I/F unit 16 to be connected to the network 3, and the like.

The storing unit 12 stores a clustering object list which is a list of printing machines 2 set as the clustering objects.

The program storing unit 13 stores OS (operating system) program (not shown), a printer driver program 13a, and various application programs 13b including a browser program, a word processing program and the like.

The CPU 11 executes each program stored in the program storing unit 13 to control operations of the whole of the printing control machine 1. In particular, the CPU 11 executes the printer driver program 13a to generate a printing job on the basis of data generated by the various application programs 13b such as the browser program and the word processing program, to send the printing job to the printing machine 2.

The CPU 11 functions as an obtaining section 11a, a determination section 11b, and a printing control section 11c by executing the printer driver program 13a.

The obtaining section 11a obtains the ink information regarding an ink of each printing machine 2 and the maintenance information set to each printing machine 2, from the printing machines 2 (the first printing machine 2A, the second printing machine 2B, the third printing machine 2C, and the fourth printing machine 2D).

The determination section 11b determines whether or not the printing machines 2 are within a similarity condition range on the basis of the ink information and the maintenance information obtained by the obtaining section 11a.

When there is a printing machine 2 determined to be out of the similarity condition range (that is, not within the similarity condition range), the determination section 11b displays a screen on the display unit 14 to inquire whether or not to use the printing machine 2 determined to be out of the similarity condition range.

The printing control section 11c allocates the printing job to printing machines 2 determined to be within the similarity condition range, and makes each of the printing machines 2 perform printing.

When it is instructed not to use the printing machine 2, which is determined to be out of the similarity condition range, the printing control section 11c allocates the printing job to the printing machines 2 determined by the determination section 11b to be within the similarity condition range, and makes each of the printing machines 2 perform printing. On the other hand, when it is instructed to use the printing machine 2 determined to be out of the similarity condition range, the printing control section 11c allocates the printing job such that the printing machines 2, which are determined by the determination section 11b to be within the similarity condition range, and the printing machine 2, which is instructed to be used, complete printing processing of the printing job substantially at the same time, and makes each of the printing machines 2 perform printing.

Operations of the printing control machine 1 and the printing machine 2 will be described below with reference to the accompanying drawings.

The printing control machine 1 mainly performs a clustering update process and a printing job division process, and the printing machine 2 performs a clustering object flag setting process. Each process will be described in detail below.

(Clustering Update Process)

Figure 2:
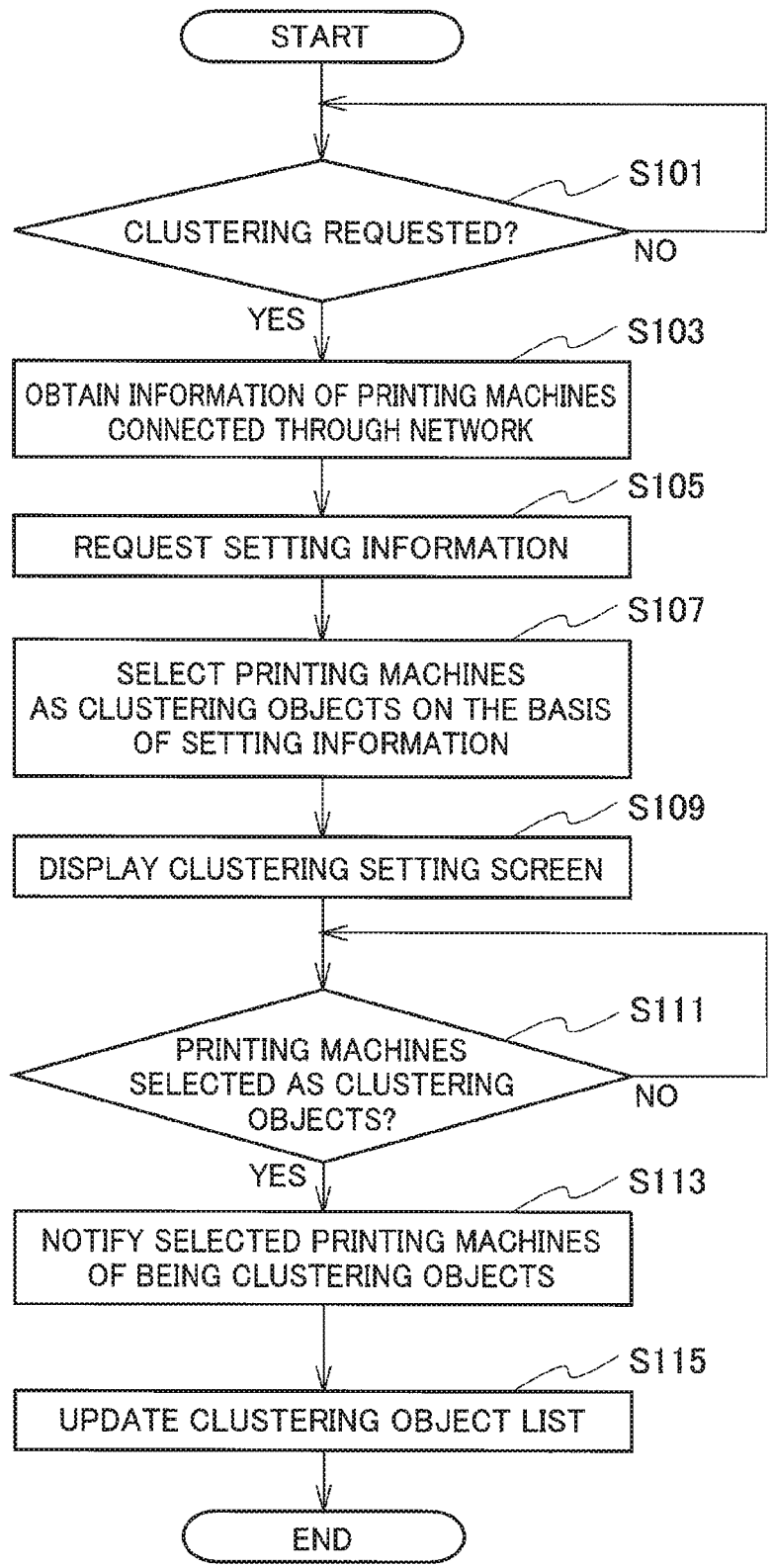
FIG. 2 is a flowchart of a clustering update process performed by a printing control machine according to the exemplary embodiment of the present invention.

FIG. 2 is a flowchart of the clustering update process performed by the printing control machine 1.

As shown in FIG. 2, when execution of printing processing by clustering using a plurality of printing machines 2 is requested through a user input into the input unit 15 (step S101), the CPU 11 works as the obtaining section 11a. The obtaining section 11a uses a network command to obtain information that represents the number of printing machines 2 (four in the present embodiment) currently connected to the printing control machine 1 through the network 3 (step S103).

When obtaining the information that represents the number of printing machines 2 currently connected to the printing control machine 1 at step S103, the obtaining section 11a requests each of the printing machines 2 connected to the printing control machine 1 to send setting information thereof (step S105). Here, the setting information includes ink information regarding ink properties such as color space information of an ink, and maintenance information regarding maintenance such as a maintenance period and maintenance intensity.

Next, the determination section 11b determines whether or not the four printing machines 2 are within the similarity condition range on the basis of the ink information and the maintenance information included in the setting information sent from each of the printing machines 2, and selects printing machines 2 as the clustering objects (step S107). For example, on the basis of color space information, which is the ink information sent from each of the four printing machines 2, the determination section 11b calculates a distance on a color space between inks used by respective two printing machines 2 among the four printing machines 2. In the present exemplary embodiment, the determination section 11b calculates distances on the color space among inks used by the four printing machines 2, thereby calculating six distances on the color space. Specifically, the determination section 11b calculates a distance on the color space between inks of the printing machines 2A and 2B, a distance on the color space between inks of the printing machines 2A and 2C, a distance on the color space between inks of the printing machines 2A and 2D, a distance on the color space between inks of the printing machines 2B and 2C, a distance on the color space between inks of the printing machines 2B and 2D, and a distance on the color space between inks of the printing machines 2C and 2D.

Among the four printing machines 2, when all distances on the color space between an ink used by a printing machine 2 (for example, printing machine 2A) and respective inks used by the other printing machines 2 (for example, printing machines 2B, 2C, and 2D) go over a predetermined color space distance threshold, the determination section 11b determines that the printing machine 2 is out of the similarity condition range in the ink information (expendable supply information). On the other hand, among the four printing machines 2, at least one distance among all distances between an ink used by a printing machine 2 (for example, printing machine 2A), and respective inks used by the other printing machines 2 (for example, printing machines 2B, 2C, and 2D) does not go over the predetermined color space distance threshold, the determination section 11b determines that the printing machine 2 is within the similarity condition range in the ink information (expendable supply information).

Moreover, on the basis of the maintenance information including the maintenance period and the maintenance intensity sent from each of the four printing machines 2, the determination section 11b determines that printing machines 2, which have the same maintenance period ("long", "medium", or "short") and the same maintenance intensity ("strong", "medium", or "weak"), are within the similarity condition range in the maintenance information. For example, when the maintenance period of each of the first to the fourth printing machines 2A to 2D is set to "long", the maintenance intensity of each of the first to the third printing machines 2A to 2C is set to "strong", and the maintenance intensity of the fourth printing machine 2D is set to "weak", the determination section 11b determines that the first to the third printing machines 2A to 2C are within the similarity condition range in the maintenance information, and the fourth printing machine 2D is out of the similarity condition range in the maintenance information.

The determination section 11b determines that printing machines 2 determined to be within the similarity condition range in the ink information and within the similarity condition range in the maintenance information are within the similarity condition range. The determination section 11b then selects printing machines 2 determined to be within the similarity condition range.

Next, the printing control section 11c displays the printing machines 2 determined by the determination section 11b to be within the similarity condition range in a list form on a clustering setting screen of the display unit 14 (step S109).

When a user selects printing machines 2 through the input unit 15, which the user hopes to set as the clustering objects, from among the printing machines 2 determined to be within the similarity condition range and displayed in the list form on the clustering setting screen of the display unit 14 (step S111; YES), the printing control section 11c notifies each of the printing machines 2, which are selected as the clustering objects, of being the clustering object (step S113). Subsequently, the printing machine 2, which is notified of being the clustering object, sets the clustering object flag to indicate that the own machine is the clustering object.

The printing control section 11c updates the clustering object list stored in the storing unit 12 as a list of printing machines 2 newly set as the clustering objects (step S115).

As described above, when clustering is requested through the user operation, the printing control machine 1 displays printing machines 2, which are suitable for clustering, in a list from the plurality of printing machines 2 connected thereto through the network 3, and sets printing machines 2 selected by the user from among the printing machines 2 suitable for clustering, as the clustering objects. The configuration of clustering is thus performed appropriately.

(Clustering Object Flag Setting Process)

Figure 3:
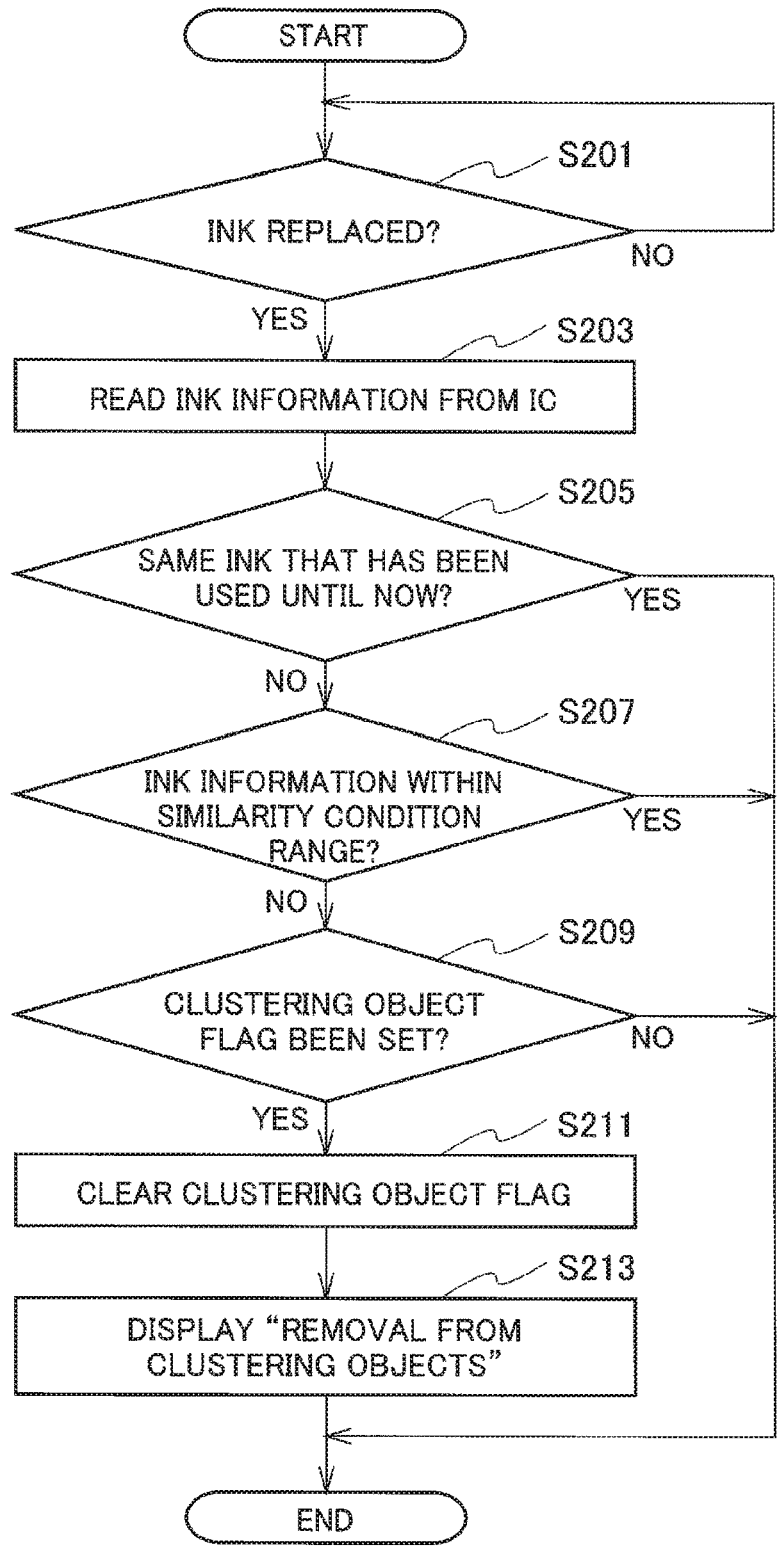
FIG. 3 is a flowchart of a clustering object flag setting process performed by a printing machine according to the exemplary embodiment of the present invention.

FIG. 3 is a flowchart of the clustering object flag setting process performed by the printing machine 2.

As shown in FIG. 3, when an ink cartridge is replaced (step S201), the CPU 21 of the printing machine 2 reads ink information stored in an IC tip included in the ink cartridge (step S203).

On the basis of the read ink information, the CPU 21 determines whether or not an ink cartridge, which contains the same ink that has been used until now, is mounted (step S205).

When the CPU 21 determines that the ink cartridge, which contains the same ink that has been used until now, is mounted (step S205; YES), the process ends as there is no need to update the clustering object flag.

On the other hand, when the CPU 21 determines that an ink cartridge, which contains an ink not being the same ink that has been used until now, is mounted (step S205; NO), the CPU 21 determines whether or not the ink, which is contained in the newly mounted ink cartridge, is within the similarity condition range (step S207). Specifically, on the basis of color space information which is ink information of the ink that has been used until now, and color space information which is ink information of the ink contained in the newly mounted ink cartridge, the CPU 21 calculates a distance between the inks on the color space. When the calculated distance on the color space does not go over the predetermined color space distance threshold, the CPU 21 determines that the ink contained in the newly mounted ink cartridge is within the similarity condition range in the ink information.

When the CPU 21 determines that the ink contained in the newly mounted ink cartridge is within the similarity condition range in the ink information (step S207; YES), the process ends as there is no need to update the clustering object flag.

On the other hand, when the CPU 21 determines that the ink contained in the newly mounted ink cartridge is not within the similarity condition range in the ink information (step S207; NO), the CPU 21 determines whether or not the clustering object flag stored in the storing unit 22 has been set (step S209).

When the clustering object flag has not been set (step S209; NO), the process ends as there is no need to update the clustering object flag.

On the other hand, when the clustering object flag has been set (step S209; YES), and if the printing machine 2, to which the new ink cartridge is mounted by replacing the ink cartridge, performs distributed processing with other printing machines 2, there is a possibility of having a problem from the perspective of productivity and quality in printing.

The CPU 21 thus clears the clustering object flag stored in the storing unit 22 (step S211), and makes the operation panel unit 24 display that the printing machine 2 is removed from the clustering objects (step S213).

As described above, when the ink cartridge is replaced, there is a case where color tones of the ink contained in the newly mounted ink cartridge are quite different from those of the ink that has been used until now. In such a case, the printing machine 2 is removed from the clustering objects. This prevents the user from having an uncomfortable feeling about a difference in colors of prints after printing processing is started.

(Printing Job Division Process)

Figure 4:
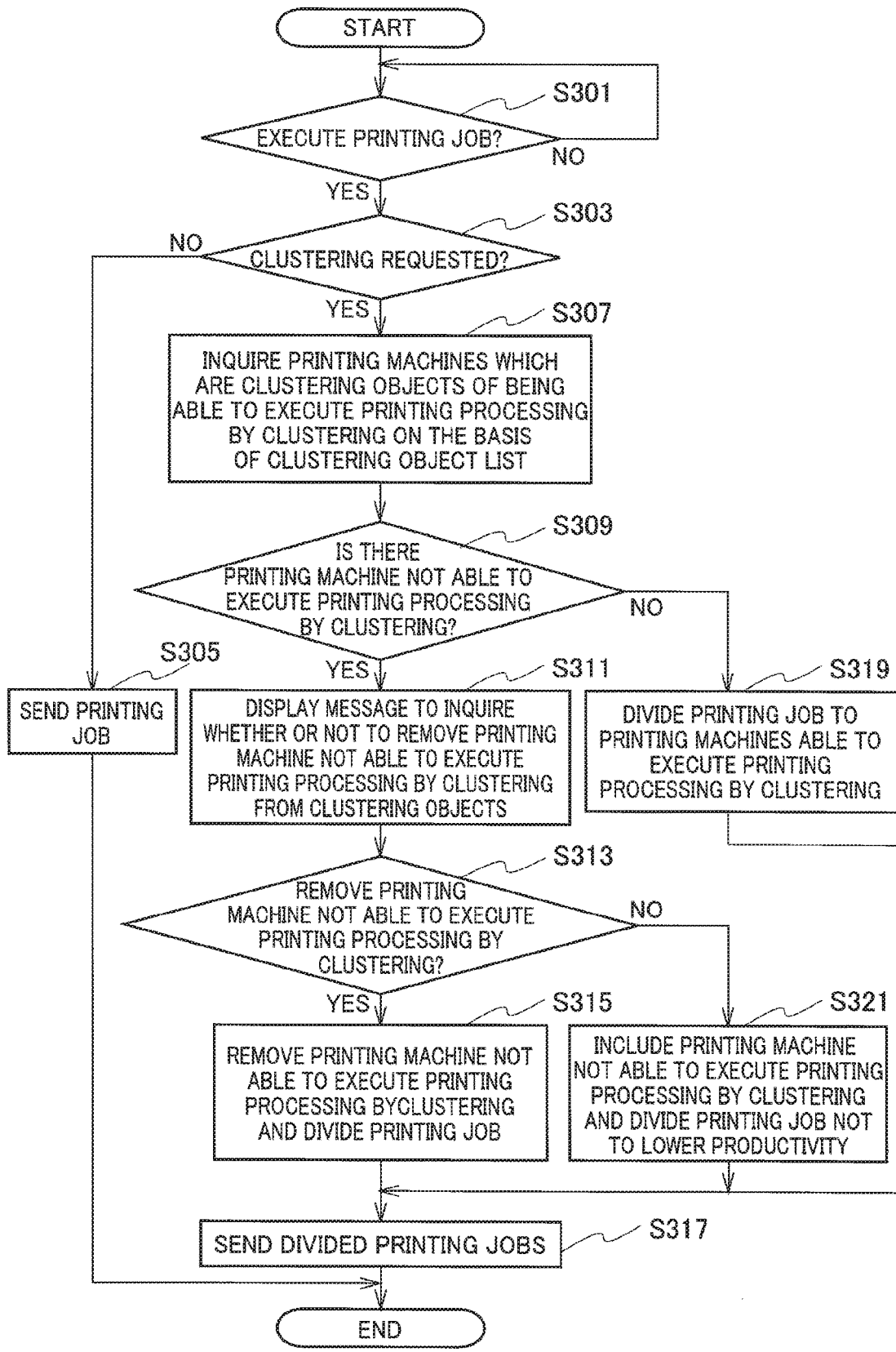
FIG. 4 is a flowchart of a printing job division process performed by the printing control machine according to the exemplary embodiment of the present invention.

FIG. 4 is a flowchart of the printing job division process performed by the printing control machine 1.

As show in FIG. 4, when execution of a printing job is requested (step S301: YES), the CPU 11 determines whether or not clustering is instructed in the execution of the printing job (step S303).

When clustering is not instructed (step S303; NO), the printing control section 11c of the CPU 11 sends the printing job to a designated printing machine 2 (step S305).

On the other hand, when clustering is instructed (step S303; YES), the printing control section 11c of the CPU 11 inquires of a plurality of printing machines 2 (first to fourth printing machines 2A to 2D in the present exemplary embodiment) shown in the clustering object list stored in the storing unit 12 whether or not execution of printing processing by clustering is possible (step S307). To this inquiry, when its own clustering object flag stored in the storing unit 2 is set, the printing machine 2 makes a response that the execution of printing processing by clustering is possible. When its own clustering object flag stored in the storing unit 2 is not set, the printing machine 2 makes a response that the execution of the printing processing by the clustering is not possible.

As a result of the inquiry at step S307, when there is no printing machine 2 which is not possible to execute the printing processing by clustering (step S309; NO), the printing job is divided by the number of the printing machines 2 shown in the clustering object list stored in the storing unit 12 (step S319). In this case, printing is performed by the plurality of printing machines 2, which have little difference in productivity. The printing job is thus equally divided among the printing machines 2.

On the other hand, as a result of the inquiry at step S307, when there is a printing machine 2 which is not possible to execute the printing processing by clustering (step S309; YES), the CPU 11 displays a message on the display unit 14 to inquire whether or not to remove the printing machine 2 which is not possible to execute printing processing by clustering, from the clustering objects (step S311).

It is noted that in step S311, the CPU 11 may further display a message on the display unit 14 to indicate that the printing machine 2, which is not possible to execute the printing processing by clustering, is within or out of the similarity condition range in the ink information and is within or out of the similarity condition range in the maintenance information.

The CPU 11 then determines whether or not the removal of the printing machine 2, which is not possible to execute the printing processing by clustering, from the clustering objects is instructed from the input unit 15 through a user operation (step S313).

When the removal of the printing machine 2, which is not possible to execute the printing processing by clustering, from the clustering objects is not instructed from the input unit 15 through the user operation (step S313; NO), the printing control section 11c divides the printing job in proportion to a ratio of productivity of each printing machine 2, so as not to lower productivity even if the printing machine 2, which is not possible to execute the printing processing by clustering, is included in the clustering objects (step S321).

Specifically, the number of pages in a printing job is set as PV (page), the speed of printing at each printing machine 2 as $V_n$(ppm) (n is the number for each printing machine 2), a maintenance period at each printing machine 2 as $M_n$(page) (n is the number for each printing machine 2), time for maintenance performed every maintenance period at each printing machine 2 as $MT_n$(sec) (n is the number for each printing machine 2), and the number of printing machines 2 which are the clustering objects, as m (m=4 in the present embodiment). The printing control section 11c first calculates the number of pages in production Job for each printing machine 2 when the printing job is equally divided using expression 1.

$$\text{Job}=PV\div m \quad \text{(Expression 1)}$$

Secondly, the printing control section 11c calculates a total maintenance time $JMT_n$ for each printing machine 2 using expression 2, and calculates a printing time $JPT_n$ of the divided printing job for each printing machine 2 using expression 3.

$$JMT_n = MT_n \times \frac{\text{Job}}{M_n} \quad \text{(Expression 2)}$$

$$JPT_n = 60 \times \frac{\text{Job}}{V_n} \quad \text{(Expression 3)}$$

The printing control section 11c adds the total maintenance time $JMT_n$ and the printing time $JPT_n$ to calculate a time $JT_n$ needed for processing the divided printing job for each printing machine 2 using expression 4. On the basis of the time $JT_n$ needed for processing the divided printing job for each printing machine 2, the printing control section 11c calculates the number of pages in production for one second $PS_n$ of each printing machine 2 using expression 5.

$$JT_n = JMT_n + JPT_n \quad \text{(Expression 4)}$$

$$PS_n = \frac{\text{Job}}{JT_n} \quad \text{(Expression 5)}$$

Using expression 6 to expression 9, the printing control section 11c divides the number of pages in the printing job PV in accordance with a ratio of the number of pages in production for one second $PS_n$ of each printing machine 2, to calculate the number of pages in production for each printing machine 2, that is, the number of pages in production $JPR_1$ of the first printing machine 2A, the number of pages in production $JPR_2$ of the second printing machine 2B, the number of pages in production $JPR_3$ of the third printing machine 2C, and the number of pages in production $JPR_4$ of the fourth printing machine 2D.

$$JPR_1 = PV \times \frac{PS_1}{\sum_o^m PS_n} \quad \text{(Expression 6)}$$

$$JPR_2 = PV \times \frac{PS_2}{\sum_o^m PS_n} \quad \text{(Expression 7)}$$

$$JPR_3 = PV \times \frac{PS_3}{\sum_o^m PS_n} \quad \text{(Expression 8)}$$

$$JPR_4 = PV \times \frac{PS_4}{\sum_o^m PS_n} \quad \text{(Expression 9)}$$

The printing control section 11c then divides the printing job on the basis of the number of pages in production $JPR_1$ to $JPR_4$ of respective printing machines 2.

For example, when distributed processing by clustering for a printing job of "100,000 (pages)" is executed using the first printing machine 2A, the second printing machine 2B, the third printing machine 2C, and the fourth printing machine 2D shown in FIG. 5, the number of pages in production per one second $PS_1$ of the first printing machine 2A is "2.174 (pages)", the number of pages in production per one second $PS_2$ of the second printing machine 2B is "1.822 (pages)", the number of pages in production $PS_3$ per one second of the third printing machine 2C is "1.786 (pages)", and the number of pages in production per one second $PS_4$ of the fourth printing machine 2D is "2.174 (pages)", as shown in FIG. 6.

As shown in FIG. 7, the number of pages in production $JPR_1$ of the first printing machine 2A is "27,325 (pages)", the number of pages in production $JPR_2$ of the second printing machine 2B is "22,904 (pages)", the number of pages in production $JPR_3$ of the third printing machine 2C is "22,446 (pages)", and the number of pages in production $JPR_4$ of the first printing machine 2D is "27,325 (pages)".

The printing control section 11c divides the printing job into the number of pages in production $JPR_1$ to $JPR_4$, and sends the corresponding divided printing job to each of the first printing machine 2A, the second printing machine 2B, the third printing machine 2C, and the fourth printing machine 2D (step S317).

It is thus possible to perform printing processing without lowering productivity to the utmost even if the clustering objects includes a printing machine 2 being out of the similarity condition range.

On the other hand, when the removal of the printing machine 2, which is not possible to execute the printing processing by clustering, from the clustering objects is instructed from the input unit 15 through the user operation (step S313; YES), the printing control section 11c removes the printing machine 2, which is not possible to execute the printing processing by clustering, from the clustering objects, and divides the printing job (step S315). In such a case where the printing job is divided with removing the printing machine 2 not possible to execute the printing processing by clustering from the clustering objects, printing is to be performed by printing machines 2 having little difference in productivity. The printing job is thus equally divided among the printing machines 2.

Subsequently, the corresponding divided printing jobs are sent to respective printing machines 2 (step S317).

As described above, the printing control machine 1 includes the obtaining section 11a to obtain from a plurality of printing machines 2 ink information (expendable supply information) regarding an ink contained in an ink cartridge mounted on each of the printing machines 2 and maintenance information set to each of the printing machines 2, the determination section 11b to determine whether or not each of the printing machines 2 is within the similarity condition range on the basis of the ink information and the maintenance information obtained by the obtaining section 11a, and the printing control section 11c to allocate a printing job to printing machines 2 determined by the determination section 11b to be within the similarity condition range and makes the printing machines 2 perform printing.

For example, there is a case where a printing machine 2, which is the same model with other printing machines 2 but uses a different ink, is connected to the printing control machine through the network 3. When properties (color space information) of the ink of the printing machine 2 are close to those of the inks of the other printing machines 2, the printing machine 2 is determined to be within the similarity condition range, and coloring of prints printed by the plurality of printing machines 2 is substantially all the same. Thus, the user does not have an uncomfortable feeling about the finish when all the prints are brought together.

Moreover, there is a case where a difference is in a frequency of maintenance or intensity of maintenance set to each of the printing machines. When a frequency of maintenance and intensity of maintenance of a printing machine 2 are close to those of the other printing machines 2, the printing machine 2 is determined to be within the similarity condition range, and time until each printing machine 2 finishes the allocated printing job is made almost equal.

Thereby, when clustering is configured by the printing machines 2 connected to the printing control machine 1 through the network 3, printing can be performed without lowering productivity and quality in the printing.

In the present exemplary embodiment, it is noted that when a distance on the color space between an ink used by one printing machine 2 among four printing machines 2 and respective inks used by the other three printing machines 2 goes over the predetermined color space distance threshold in all combinations, the determination section 11b determines that the ink used by the one printing machine 2 is out of the similarity condition range in the ink information. When a distance on the color space between an ink used by one printing machine 2 among four printing machines 2 and respective inks used by the other three printing machines 2 does not go over the predetermined color space distance threshold range in at least one combination, the determination section 11b determines that the ink used by the one printing machine 2 is within the similarity condition range in the ink information. The determination whether or not an ink of a printing machine 2 is within the similarity condition range in the ink information is however not limited to this method.

For example, the determination section 11b may determine that an ink used by one printing machine 2 is out of the similarity condition range in the ink information when a distance on the color space between the ink used by the one printing machine 2 and respective inks used by the other printing machines goes over the predetermined color space distance threshold at least in one combination.

In the present exemplary embodiment, the ink information that is information regarding ink properties such as color space information of an ink, is used as the expendable supply information, but it is not limited to this information. For example, when a stencil printing machine is used as the printing machine, master information that is information regarding master properties such as thickness of a master and/or a type of a master, may be used. Moreover, sheet information that is information regarding sheets such as thickness of a sheet and/or a type of sheets, may be used.

For example, when the thickness of a master, which is expendable supply information sent from each of the first to the fourth printing machines 2A to 2D, is set to the same level among "thick", "normal", and "thin", and the type of the master, which is expendable supply information sent from each of the first to the fourth printing machines 2A to 2D, is set to the same type among "type A", "type B", and "type C", each printing machine 2 is determined to be within the similarity condition range in the expendable supply information.

In the present exemplary embodiment, the obtaining section 11a obtains from each of the printing machines 2, the ink information (expendable supply information) regarding an ink mounted on the corresponding printing machine 2 and the maintenance information set on the corresponding printing machine 2. On the basis of the ink information and the maintenance information obtained by the obtaining section 11a, the determination section 11b determines whether or not each of the printing machines 2 is within the similarity condition range. However, the determination is not limited to this method. The obtaining section 11a may obtain from each of the printing machines 2, only the ink information (expendable supply information) regarding an ink mounted on the corresponding printing machine 2. On the basis of the ink information obtained by the obtaining section 11a, the determination section 11b may determine whether or not each of the printing machines 2 is within the similarity condition range. The user thus does not have an uncomfortable feeling about the finish as well when all the prints are brought together.

In the present exemplary embodiment, the number of printing machines connected to the printing control machine 1 is set as four. It is however not limited to four. The number of printing machines connected to the printing control machine 1 is required only to be two or more.

What is claimed is:

1. A printing control machine that is connected to a plurality of printing machines through a network and, by clustering two or more printing machines among the plurality of printing machines, makes the two or more printing machines perform distributed processing for a printing job, the printing control machine comprising:
a processor that
obtains from each of the plurality of printing machines, expendable supply information regarding a property of an expendable supply related to image forming and mounted to the each printing machine,
determines whether or not one printing machine of the plurality of printing machines is within a similarity condition range based on the expendable supply information by
comparing an expendable supply property of the one printing machine with an expendable supply property of another printing machine of the plurality of printing machines, and
determining that the one printing machine is within the similarity condition range when the expendable supply property of the one printing machine is the same as or is within a predetermined difference with the expendable supply property of the another printing machine, and
allocates the printing job to printing machines determined to be within the similarity condition range to make the determined printing machines perform printing.

2. The printing control machine according to claim 1, wherein the processor
obtains maintenance information from each of the plurality of printing machines,
determines whether or not each of the plurality of printing machines is within the similarity condition range based on the expendable supply information and the maintenance information, and
allocates the printing job to the printing machines determined to be within the similarity condition range to make the determined printing machines perform printing.

3. The printing control machine according to claim 1, further comprising a display,
wherein when there is a printing machine determined to be out of the similarity condition range, the processor displays an inquiry screen on the display to inquire whether or not to use the printing machine determined to be out of the similarity condition range, and
wherein when it is instructed not to use the printing machine determined to be out of the similarity condition range, the processor allocates the printing job to the printing machines determined to be within the similarity condition range to make the determined printing machines perform printing.

4. The printing control machine according to claim 3, wherein when it is instructed to use the printing machine determined to be out of the similarity condition range, the processor allocates the printing job such that the printing machines determined to be within the similarity condition range and the printing machine instructed to be used, complete printing processing of the printing job at the same time.

5. A printing system, comprising:
a plurality of printing machines; and
a printing control machine that is connected to the plurality of printing machines through a network and, by clustering two or more printing machines among the plurality of printing machines, makes the two or more printing machines perform distributed processing for a printing job, wherein each of the plurality of printing machines sends, on reception of an inquiry of expendable supply information regarding a property of an expendable supply related to image forming and mounted to the each printing machine and maintenance information regarding a setting of maintenance set on the each printing machine, the expendable supply information and the maintenance information to the printing control machine, and wherein the printing control machine includes a processor that
- obtains the expendable supply information and the maintenance information from each of the plurality of printing machines,
- determines whether or not one printing machine of the plurality of printing machines is within a similarity condition range based on the expendable supply information and the maintenance information by
- comparing an expendable supply property and a maintenance setting of the one printing machine with an expendable supply property and a maintenance setting of another printing machine of the plurality of printing machines, and
- determining that the one printing machine is within the similarity condition range when the expendable supply property and the maintenance setting of the one printing machine are the same as or are within predetermined differences with the expendable supply property and the maintenance setting, respectively, of the another printing machine, and allocates the printing job to printing machines determined to be within the similarity condition range to make the determined printing machines perform printing.

\* \* \* \* \*